(12) United States Patent
Dotschkal et al.

(10) Patent No.: US 10,161,739 B2
(45) Date of Patent: Dec. 25, 2018

(54) COORDINATE-MEASURING MACHINE

(71) Applicant: CARL ZEISS INDUSTRIELLE MESSTECHNIK GMBH, Oberkochen (DE)

(72) Inventors: Florian Dotschkal, Aalen (DE); Stephan Rieger, Oberkochen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 148 days.

(21) Appl. No.: 15/441,452

(22) Filed: Feb. 24, 2017

(65) Prior Publication Data

US 2017/0248407 A1 Aug. 31, 2017

(30) Foreign Application Priority Data

Feb. 29, 2016 (DE) .................. 10 2016 103 557

(51) Int. Cl.
*G01B 11/03* (2006.01)
*G01B 11/00* (2006.01)
*G01B 21/04* (2006.01)

(52) U.S. Cl.
CPC .......... *G01B 11/005* (2013.01); *G01B 21/047* (2013.01)

(58) Field of Classification Search
CPC .............................. G01B 11/005; G01B 21/047
USPC ............................................................ 33/503
See application file for complete search history.

(56) References Cited

U.S. PATENT DOCUMENTS

| | | | |
|---|---|---|---|
| 5,430,547 A * | 7/1995 | Takagi | G01B 11/005 33/503 |
| 6,617,602 B2 | 9/2003 | Kodama et al. | |
| 7,905,031 B1 * | 3/2011 | Paulino | G01B 21/04 33/503 |
| 2003/0053037 A1 | 3/2003 | Blaesing-Bangert et al. | |
| 2004/0131244 A1 | 7/2004 | Nehse et al. | |
| 2014/0157610 A1 * | 6/2014 | Garvey | G01B 21/04 33/503 |
| 2015/0355101 A1 | 12/2015 | Sun | |

(Continued)

FOREIGN PATENT DOCUMENTS

| | | |
|---|---|---|
| DE | 102 15 135 A1 | 10/2002 |
| DE | 101 40 174 A1 | 3/2003 |
| DE | 10 2012 103 554 A1 | 6/2013 |

(Continued)

*Primary Examiner* — G. Bradley Bennett
(74) *Attorney, Agent, or Firm* — Harness, Dickey & Pierce, P.L.C.

(57) ABSTRACT

A coordinate measuring machine comprising an optical sensor for optically capturing a workpiece; an illumination device for illuminating the workpiece; a pose determination unit for determining data relating to a workpiece pose including a position and orientation of the workpiece; a storage unit for storing (i) data relating to a reference pose including a position and orientation of a reference workpiece, and (ii) data relating to a reference light setting of the illumination device used for a measurement of the reference workpiece; and a control unit which is configured to control a light setting of the illumination device for a measurement of the workpiece by adapting the reference light setting based on a comparison of the stored data relating to the reference pose with the determined data relating to the workpiece pose.

14 Claims, 5 Drawing Sheets

(56) References Cited

U.S. PATENT DOCUMENTS

2016/0146589 A1* 5/2016 Jonas .................. G01B 21/045
                                                      33/503
2016/0195382 A1* 7/2016 McMurtry ........... G01B 21/045
                                                      33/503

FOREIGN PATENT DOCUMENTS

| DE | 20 2014 009 224 U1 | 5/2015 |
| DE | 10 2015 210 440 A1 | 12/2015 |
| DE | 10 2014 012 883 A1 | 2/2016 |
| EP | 1 373 827 B1 | 10/2009 |

* cited by examiner

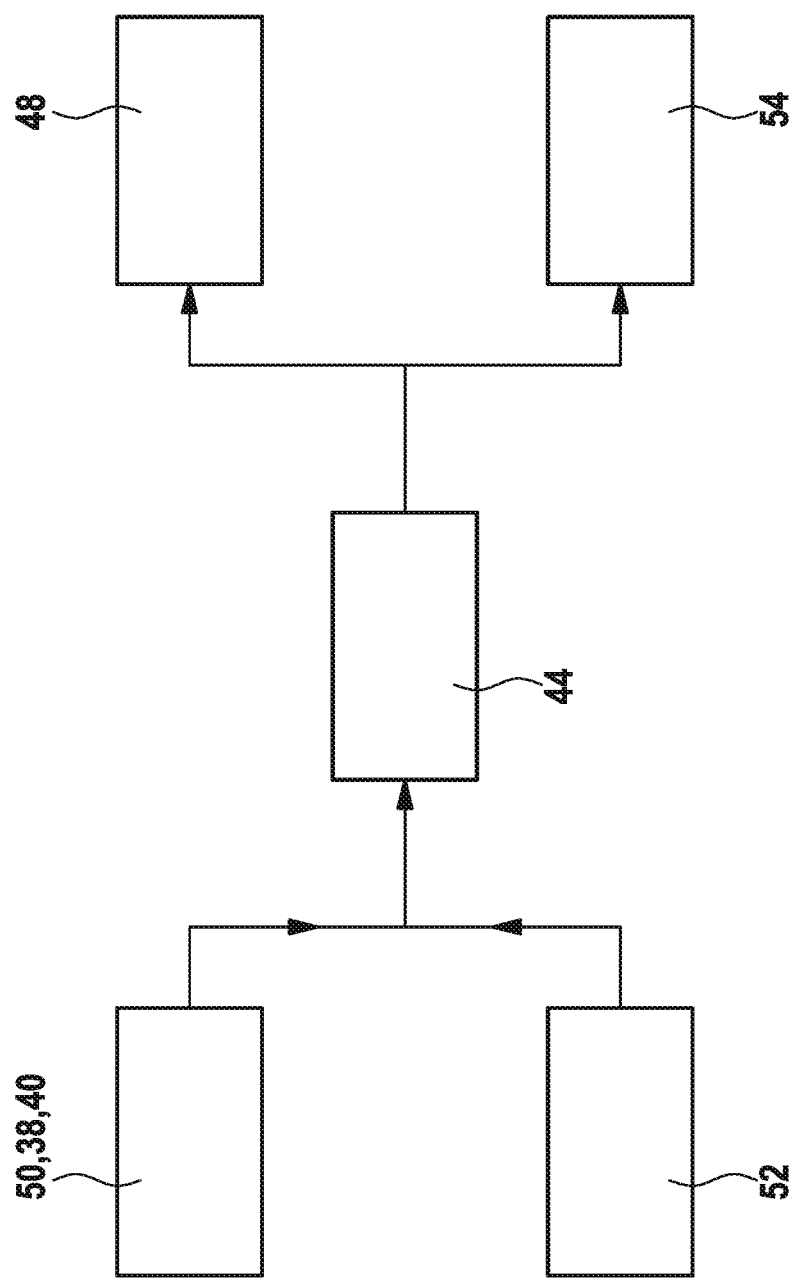

COORDINATE-MEASURING MACHINE

CROSS-REFERENCES TO RELATED APPLICATIONS

This application claims priority from German patent application DE 10 2016 103 557.2, filed on Feb. 29, 2016. The entire content of this priority application is incorporated herein by reference.

BACKGROUND OF THE INVENTION

The present disclosure relates to a coordinate measuring machine, in particular to an optical coordinate measuring machine, having an optical sensor for optically capturing a workpiece to be measured, an illumination device for illuminating the workpiece to be measured, and a pose determination unit for determining data relating to the position and orientation of the workpiece to be measured.

An exemplary coordinate-measuring machine of this type is known for example from DE 101 40 174 A1 and DE 10 2012 103 554 A1.

Coordinate measuring machines serve for checking workpieces, for example as part of quality assurance, or for ascertaining the geometry of a workpiece as part of what is known as "reverse engineering." Moreover, various other application possibilities are conceivable.

In coordinate measuring machines, different types of sensors may be used to capture the workpiece to be measured. By way of example, sensors that measure in tactile fashion are known in this respect, as are sold by the applicant under the name "VAST XT" or "VAST XXT". Here, the surface of the workpiece to be measured is scanned with a stylus, the coordinates of said stylus in the measurement space being known at all times. Such a stylus may also be moved along the surface of a workpiece in a manner such that a multiplicity of measurement points can be captured at set time intervals during such a measurement process as part of a so-called "scanning method".

It is moreover known to use optical sensors that facilitate contactless capturing of the coordinates of a workpiece. The present disclosure relates to such a coordinate measuring machine having an optical sensor. One example of such an optical sensor is the optical sensor sold by the applicant under the name "ViScan". An optical sensor of this type can be used in various types of measurement setups or coordinate measuring machines. Examples of such coordinate measuring machines are the products "O-SELECT" and "O-INSPECT", which are sold by the applicant.

Some examples of coordinate measuring machines, including the "O-INSPECT" just mentioned, use both an optical sensor and a tactile sensor, for example in order to be able to perform various examination tasks at a single machine and ideally with a single clamping of the workpiece to be measured. Coordinate measuring machines of this type are also referred to as multisensor coordinate measuring machines.

For an exact measurement, it is mandatory in an optical coordinate measuring machine to provide a suitable illumination of the workpiece to be measured. In addition to what is known as transmitted-light illumination, where the light source is situated, relative to the optical sensor, behind the workpiece, what is known as incident-light illumination or reflected-light illumination is typically used in order to illuminate the workpiece on its top side, which faces the optical sensor. Illumination that is adapted exactly to the workpiece is of utmost importance, in particular because it is possible to hereby improve the bright-to-dark contrast that is necessary in the optical detection of the workpiece. For this reason, the illumination must be adapted individually by the user of the coordinate measuring machine to the shape and the geometric properties of the workpiece. Matching the light setting of the illumination device in this fashion can at times take a relatively large amount of time. What should in principle also be ensured is that identical workpieces are also measured under respectively identical light conditions.

The simplest approach, specifically that of performing the light settings separately for each workpiece by hand, is highly time-consuming and prone to errors. Comparable measurements can hardly be ensured in this way. For this reason, serial measurements of a plurality of workpieces having identical construction are frequently performed with identical light settings. During this process, the light settings are optimized for the first workpiece only before the measurement thereof and are then maintained. In order to rule out a change in orientation of the subsequent workpieces relative to the illumination device, the workpieces are placed, always in the same way, into specifically provided clamping apparatuses on the measurement table of the coordinate measuring machine. However, the use of such clamping aids is costly and not practical either if the workpiece types frequently change.

Another possibility for solving the above-mentioned problem is the automated production of a plurality of predefined illumination scenarios before a new workpiece is measured and the successive examination of the contrast ratios for each illumination scenario that occur in the region of the workpiece so as to finally select the "optimum" illumination scenario for the respective workpiece. A similar optimization method for selecting the "optimum" light settings of the illumination device in coordinate measuring machines is known from DE 102 15 135 A1. However, it is to be understood that even an optimization method of this type is relatively time-consuming and likewise requires a relatively large computer-assisted computational outlay.

SUMMARY OF THE INVENTION

It is thus an object to provide a coordinate measuring machine which overcomes the above-stated disadvantages. It is particularly an object to adapt the light settings of the illumination device of the coordinate measuring machine in optimum fashion to the circumstances relating to the workpiece, without this resulting in a time-consuming process or requiring a large computational outlay.

According to an aspect of the present disclosure, a coordinate measuring machine is provided which comprising an optical sensor for optically capturing a workpiece, an illumination device for illuminating the workpiece, and a pose determination unit for determining data relating to a workpiece pose including a position and orientation of the workpiece. The coordinate measuring machine further comprises a storage unit for storing (i) data relating to a reference pose including a position and orientation of a reference workpiece, and (ii) data relating to a reference light setting of the illumination device used for a measurement of the reference workpiece. Still further, the coordinate measuring machine comprises a control unit which is configured to control a light setting of the illumination device for a measurement of the workpiece by adapting the reference light setting based on a comparison of the stored data relating to the reference pose with the determined data relating to the workpiece pose.

According to a further aspect of the present disclosure, a method for controlling an illumination device of an optical coordinate measuring machine is presented which comprises the steps of:

storing (i) data relating to a reference pose including a position and orientation of a reference workpiece, and (ii) data relating to a reference light setting of the illumination device used for a measurement of the reference workpiece, determining data relating to a workpiece pose including a position and orientation of a workpiece to be measured, and controlling the light setting of the illumination device for a measurement of the workpiece by adapting the reference light setting based on a comparison of the stored data relating to the reference pose with the determined data relating to the workpiece pose.

One of the ideas of the present disclosure is an automated control of the illumination device of the optical coordinate measuring machine in dependence on the pose of the workpiece, i.e. the orientation and position of the workpiece. Initially the light setting of the illumination device is adapted for a reference workpiece optimally with respect to its pose. This reference light setting is then stored together with the data relating to the reference pose, i.e. the position and orientation of the reference workpiece. The data may be stored, for example, in what is known as a test plan, and later retrieved for a measurement of a workpiece having the same construction. In such a later measurement, the position and orientation of the new workpiece to be measured is determined and compared to the stored position and orientation of the reference workpiece. The reference light setting that is stored for illuminating the reference workpiece is then adapted on the basis of said position and orientation comparison.

Once the light conditions have been optimized for a reference workpiece, the above-mentioned procedure or principle makes it possible to reproduce said light conditions when measuring a subsequent workpiece of identical construction, without having to position the workpieces in a specific, predefined position and/or orientation in relation to the optical sensor. The light conditions consequently do not need to be adapted all over again in advance to the respective workpiece whenever new workpieces are measured, because the already known light conditions, which were optimized for a reference workpiece, can be used and merely need to be adapted to the new orientation and position of the workpiece that is to be measured. This simplifies the measuring procedure. Not only that, it also entails an enormous time saving. The necessary computational outlay is also reduced.

The reference workpiece may be an actual, physical workpiece. However, the reference workpiece may also be an "imaginary" workpiece having component equivalence that is available in the form of CAD data or technical drawing data. The data relating to the pose of the reference workpiece may consequently comprise CAD data. Establishing the test procedure and setting the reference light conditions for the reference workpiece is therefore also conceivable using CAD data in a simulation environment.

Since adapting the light setting is automated, no clamping apparatus is required for positioning the workpieces consistently in the same position and orientation relative to the optical sensor.

In order to reproduce the light conditions that were defined for the reference workpiece for the workpiece that is to be measured, the illumination device must recreate the virtual movement which is obtained from the difference in position and orientation of the workpiece to be measured as compared to the position and orientation of the reference workpiece. This "recreation" of the movement or change in position and orientation between the workpiece currently to be measured and the reference workpiece can be effected physically and/or virtually.

In a refinement, the coordinate measuring machine comprises an actuator for moving the illumination device relative to the workpiece, wherein the control unit is configured to effect the adaptation of the reference light setting by way of moving the illumination device using the actuator.

A potential actuator, for example, would be an electric motor which moves the illumination device on the basis of the above-mentioned position and orientation comparison such that the position and orientation of the illumination device, relative to the workpiece, corresponds to the relative position and orientation which the illumination device has adopted relative to the reference workpiece in the reference scenario that is stored in the storage unit. If the workpiece that is to be measured is arranged on the measurement table of the coordinate measuring machine such that it is rotated compared to the reference workpiece for example by 45° about an axis, the control unit rotates the illumination device likewise by 45° about the same coordinate axis in this case. The actuator can alternatively be configured to move the workpiece table in translational and/or rotatory fashion, since what counts is only a relative movement between the illumination device and the workpiece.

According to a further refinement, the illumination device has a plurality of illumination segments, wherein the light intensity of each illumination segment may be regulated individually, and wherein the control unit is configured to effect the adaptation of the reference light setting by way of controlling the light intensity of the illumination segments.

In this case, the light conditions are thus not adapted by way of an actual, physical movement of the illumination device, but by recreating the movement virtually by way of adapting the light intensity of the illumination segments. Compared to an adaptation by way of a physical movement of the illumination device, this has the advantage that no additional drive for moving the illumination device is necessary. Not only does this represent a cost saving, but it also has a positive effect with respect to the accuracy of the measurement. This is because any movement and generation of heat that is caused by an additional actuator in the measurement head of the coordinate-measuring machine and that could negatively affect the accuracy of the measurement can thus be avoided.

The above-mentioned adaptation based on controlling the light intensity of the individual illumination segments of the illumination device preferably takes place by way of a virtual image that assigns to the individual illumination segments new light intensity values as compared to the reference light setting. This type of image reconstructs, as it were, the illumination orientation of the reference workpiece for the workpiece that is to be measured on the basis of a reassignment of the light intensity values of the illumination segments. To this end, the data relating to the reference light setting preferably contain an assignment of individual light values for each of the illumination segments, and the control unit is preferably configured to effect the adaptation of the reference light setting by changing said assignment based on the comparison of the stored reference pose with the determined workpiece pose.

In the above-mentioned example of a rotation of the workpiece by 45° relative to the position of the reference workpiece, this rotation by 45° would be applied virtually to each illumination segment. The assignment of the light intensity values used for measuring the reference workpiece would thus be adapted virtually by 45°. The light intensity value that is assigned to a specific illumination segment would be assigned to a different illumination segment that has, relative thereto, an offset of 45°. In the ideal case, this change in position can be imaged directly onto a new, real illumination segment of the illumination device. However, it may also be the case that this is not possible, for example in the case where the workpiece that is to be measured is rotated by 5° relative to the reference workpiece and two neighboring illumination segments have an angular distance of 10° relative to one another.

In a refinement, the control unit is configured to interpolate between light intensity values which are assigned in said assignment to two neighboring illumination segments in order to change the reference assignment based on the comparison of the stored reference pose with the workpiece pose. With particular preference in this case, the control unit is configured to perform said interpolation of the light intensity values proportionally to the distance of the two neighboring illumination segments from the ideal imaging point.

The illumination device is preferably an incident-light illumination device which is arranged coaxially around the optical sensor. The illumination device has preferably the shape of an annulus. Consequently, the illumination segments preferably have the shape of an annulus segment. Each illumination segment preferably has at least one illuminant.

According to a further refinement, the illumination segments each have at least one first illuminant for generating light in a first color of light and at least one second illuminant for generating light in a second color of light. Each illumination segment preferably furthermore has at least three illuminants, each for generating a different color of light.

This refinement has the advantage that the colors of light of the individual illumination segments can likewise be regulated individually. This is advantageous in particular if the workpiece to be measured itself is colored, since in this case it is possible to improve the contrast by accordingly adapting the color of the light. It is to be understood that the above-described adaptation of the light intensity values can be performed accordingly even in the case of illumination segments having a plurality of differently colored illuminant. However, in this case the same number and the same type of illuminant are preferably used for each illumination segment.

According to a further refinement, the change in position and orientation between the workpiece to be measured and the reference workpiece is compensated for with a physical movement of the illumination device in the above-mentioned manner and also with a virtual image by way of adapting, in the above-mentioned manner, the light intensity values that are assigned to the individual illumination segments. It would be possible, for example, to perform the translational part of the position or orientation difference between the workpiece to be measured and the reference workpiece by way of a physical relative movement of the illumination device relative to the workpiece to be measured. One way this can be done is by moving the entire measurement head of the coordinate-measuring machine to which the optical sensor and the illumination device are also fixed. Alternatively or additionally, this can also be done using a movement of the measurement table on which the workpiece is arranged. A rotatory component of the position and orientation difference between the workpiece to be measured and the reference workpiece could be compensated for in this refinement with the above-mentioned virtual movement or adaptation of the light intensity values of the illumination segments.

The position and orientation of the workpiece to be measured are preferably determined automatically or at least partially automatically. In general, several procedures are conceivable in this respect.

According to a refinement, the optical sensor is part of the pose determination unit for determining the data relating to the workpiece pose. The data relating to the reference pose preferably comprise image data and/or CAD data of the reference workpiece. Similarly, the data relating to the workpiece pose also comprise image data and/or CAD data of the workpiece to be measured. The pose data must therefore be available not explicitly in the form of coordinates, but are preferably available in the form of image data, on the basis of which the position and orientation of the workpiece or of the reference workpiece can be ascertained by converting pixel coordinates into 2D or 3D coordinates. According to this refinement, the control unit is configured to effect the comparison of the reference pose with the workpiece pose by way of comparing the image data of the reference workpiece with the image data of the workpiece to be measured. The control unit is preferably configured to compare the image data of the reference workpiece with the image data of the workpiece to be measured using a shape-based matching.

In summary, the detection of the pose of the workpiece to be measured and the pose comparison are effected preferably as follows: First, a reference image is produced. This reference image is produced either by an actual reference workpiece having component equivalence or by a CAD model of a workpiece having component equivalence. A coordinate system which serves for the conversion of the pixel coordinates into geometric coordinates is assigned to this reference image, unless a coordinate system is already present (as is the case, for example, in a CAD model). The coordinate system is preferably defined on the basis of characteristic points and characteristic alignments of the workpiece. For example, the origin of the coordinate system can be located in the centroid of the workpiece, and the coordinate axes can be aligned parallel to the image peripheries or parallel to the main axes of the workpiece. The reference image is then stored in the storage unit, specifically together with the additional information of the image scale, the image orientation and the image position relating to an absolute coordinates system that is defined for the coordinate-measuring machine. The information mentioned thus forms said data relating to the reference pose. If a workpiece having component equivalence is to be measured, image data of the workpiece to be measured is captured by the optical sensor and evaluated in the manner described above. The difference in position and orientation can be ascertained on the basis of an image comparison using an image-based matching. Generally speaking, all customary matching procedures are conceivable for this purpose, i.e. including descriptor-based matching which searches for identical texture patterns, or matching on the basis of optical markings, or the like. The use of shape-based matching is preferred.

Instead of matching, the last mentioned step of comparing the position and orientation between the workpiece to be measured and the reference workpiece can also be performed manually or partially automatically, by way of the user interactively selecting mutually corresponding image points both in the reference image and in the image of the workpiece that is to be measured now, and by the control unit then calculating the change in position of the corresponding image points with respect to one another.

According to a further, alternative refinement, the pose determination unit comprises a tactile sensor.

This case thus involves a multisensor coordinate measuring machine. The position and orientation of the workpiece to be measured could then be determined on the basis of tactile scanning.

It is understood that the aforementioned features and those yet to be explained below may be used not only in the respectively specified combination but also in other combinations or on their own, without departing from the spirit and scope of the present disclosure.

BRIEF DESCRIPTION OF THE DRAWINGS

FIG. 2 shows a schematic block diagram for illustrating central functions of the coordinate system according to the disclosure;

PREFERRED EMBODIMENTS OF THE INVENTION

Figure 1:
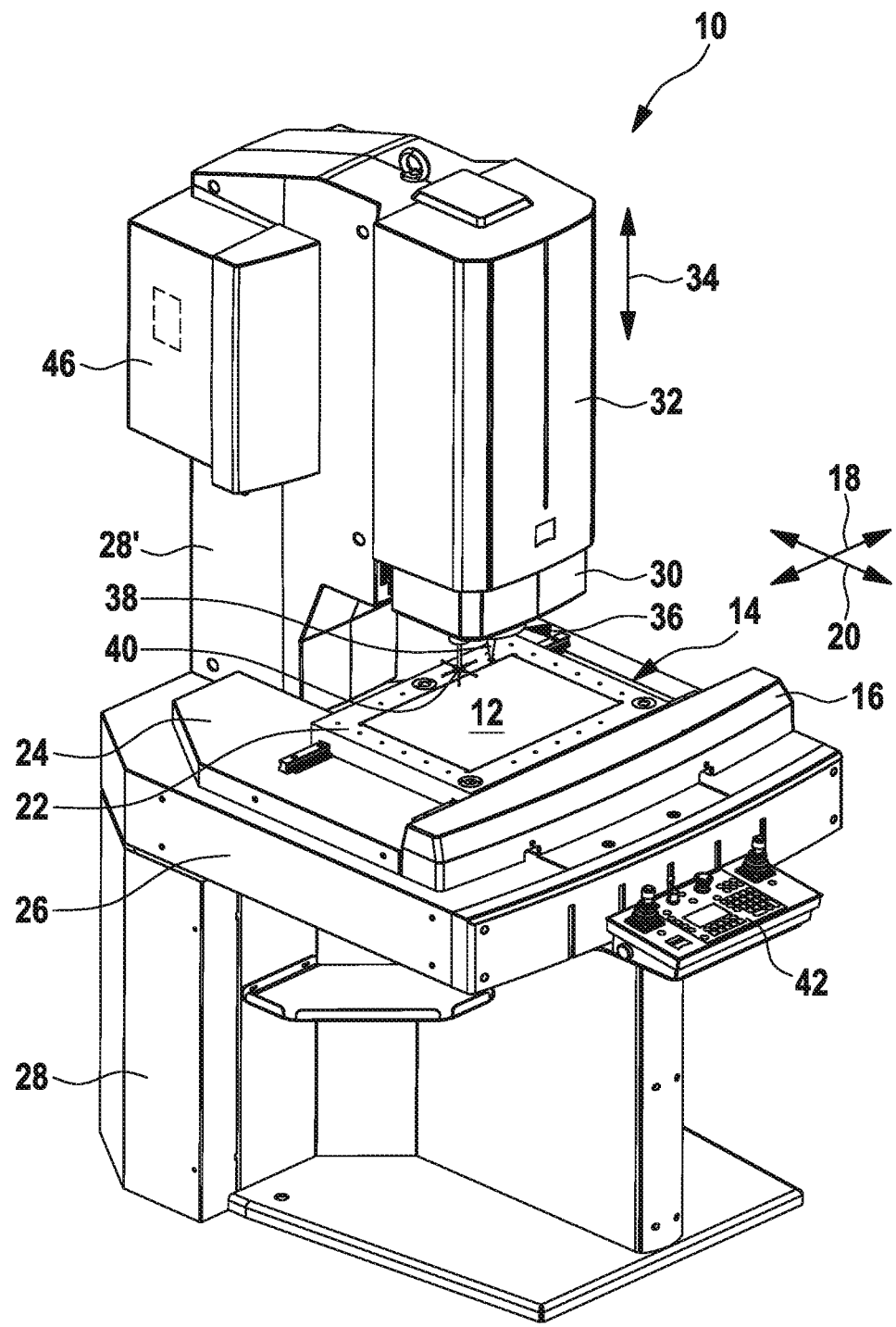
FIG. 1 shows a perspective view of an exemplary embodiment of a coordinate measuring machine.

FIG. 1 shows a coordinate measuring machine according to an exemplary embodiment of the present disclosure. The coordinate measuring machine as a whole is here denoted with the reference numeral 10.

The coordinate measuring machine 10 has a workpiece holder 12, on which the workpiece to be measured can be placed. This workpiece holder 12 is arranged on a measurement table 14. Depending on the embodiment of the coordinate measuring machine, said measurement table can be a fixed, that is to say a non-moving measurement table. However, in the embodiment illustrated in FIG. 1, the measurement table 14 is one which is linearly displaceable along two mutually orthogonal coordinate axes 18, 20 in the measurement table plane using a positioning device 16. The first coordinate axis 18 is normally referred to as the x-axis, and the second coordinate axis 20 is normally referred to as the y-axis.

In the exemplary embodiment of the coordinate measuring machine 10 shown in FIG. 1, the measurement table 14 is implemented in a construction type known as a cross table. It has a linearly displaceable x-table 22 along the first coordinate axis 18 (x-axis), on whose top side the workpiece holder 12 is arranged. The x-table 22 in turn is arranged on a y-table 24, which is parallel to the former and is used to linearly displace the workpiece holder 12 along the second coordinate axis 20 (y-axis). The y-table 24 in turn is arranged on a solid base plate 26, also frequently referred to as the main plate 26. The base plate 26 serves as the carrier structure for the measurement table 14 and is usually connected in integrated fashion with a machine frame 28.

The machine frame 28 has, in addition to the lower part which supports the base plate 26, an upper part 28', which is frequently, but not necessarily connected in integrated fashion with the lower part of the machine frame 28. This upper part 28' of the machine frame 28 is frequently also referred to as the z-column.

In the exemplary embodiment of the coordinate measuring machine 10 shown in FIG. 1, what is known as a z-carriage 30 is mounted on the z-column 28' such that it is linearly displaceable. This z-carriage is guided, preferably using a linear guide, within a carriage housing 32, which is fixedly connected to the z-column 28'. The z-carriage is thus displaceable along a third coordinate axis 34, which is usually referred to as the z-axis, in a manner orthogonal to the measurement table 14 or orthogonal to the two other coordinate axes 18, 20. Arranged on the bottom side of the z-carriage 30, which faces the measurement table 14, is a measurement head 36. Depending on the embodiment of the coordinate measuring machine 10, the measurement head 36 has one or more sensors for capturing the coordinates or the geometry of the workpiece to be measured. In the exemplary embodiment of the coordinate measuring machine 10 shown in FIG. 1, the measurement head 36 has an optical sensor 38 and a tactile sensor 40. The optical sensor 38 serves for optically capturing the workpiece to be measured. The tactile sensor 40 serves for capturing the workpiece in a tactile fashion.

The coordinate measuring machine 10 furthermore has operating and switching instruments 42, with which a user can manually control or position the sensors 38, 40 and the workpiece holder 12. According to the exemplary embodiment shown in FIG. 1, a control unit 44 (see FIG. 2) for controlling a multiplicity of components of the coordinate measuring machine 10 is arranged in a receiving container 46, which is mounted on the z-column 28'.

It is to be understood that the coordinate measuring machine 10 which is shown in FIG. 1 is merely one of many possible exemplary embodiment of a coordinate measuring machine, in which the present disclosure may be implemented. The measurement table 14 can in principle also be configured to be non-moving. The manner in which the measurement head 36 is suspended at the machine frame 28 may also differ in principle. The coordinate measuring machine 10 shown in FIG. 1 is a multisensor coordinate measuring machine having an optical and a tactile sensor 38, 40. However, for the present disclosure, a purely optical coordinate measuring machine (that is to say without tactile sensor 30) would likewise be conceivable.

An aspect of the present disclosure relates to the type of illumination of the workpiece. Illumination of is used for improving the optical capturing of the workpiece using the optical sensor 38.

When optically capturing the workpiece, it is important to produce the strongest contrasts possible using the illumination on the workpiece, since this simplifies finding edges or capturing the surface geometry of the workpiece. Against this background, it is easy to see that the illumination must be adapted individually to the geometry and to the position and orientation of the workpiece to be measured relative to the optical sensor 38. Typically, an illumination device of such coordinate measuring machines comprises transmitted-light illumination and incident-light illumination. The light source of the transmitted-light illumination is typically located in the measurement table 14 on the lower side of the workpiece support 12, which faces away from the optical sensor 38. Consequently, the workpiece is located between the light source and the optical sensor 38, with result that a shadow image having great edge sharpness is imaged on the sensor surface. By contrast, the incident-light illumination illuminates the workpiece to be measured from its upper side. The incident-light illumination is preferably arranged coaxially around the optical sensor 38 (not visible in FIG. 1). It is preferably annular-circular. An exemplary embodiment of such an annular-circular incident-light illumination device 48 is shown in FIGS. 3-5 in each case on the right-hand side in plan view from below. The construction, control and function of this illumination device 48 according to the disclosure will be explained in detail below with reference to FIGS. 2-5.

FIG. 2 shows a schematic block diagram, with which the function and control of the illumination device 48 according to the present disclosure can be explained. According to the present disclosure, the coordinate measuring machine 10 has a pose determination unit 50 for determining data relating to a workpiece pose, wherein the workpiece pose includes the position and orientation of the workpiece to be measured. The optical sensor 38 and/or the tactile sensor 40 are part of said pose determination unit 50. Moreover, said pose determination unit 50 preferably comprises a calculation unit, which is implemented for example in the form of a computer processor. This calculation unit is configured to calculate the workpiece pose from the signals received from the optical sensor 38 and/or tactile sensor 40. In the case of the optical sensor 38, an image is thus calculated and reconstructed based on the signals received from the optical sensor 38. Based on said 2D or 3D image data, it is then possible to determine the position and orientation of the workpiece to be measured (the workpiece pose) and its geometry. Alternatively, the workpiece is scanned using the tactile sensor 40 at a multiplicity of measurement points, and the workpiece pose and the geometry of the workpiece are calculated based thereon. A further alternative is the use of CAD data. According to the present disclosure, the coordinate measuring machine 10 also has a storage unit 52, which may be implemented in the form of electronic data storage (for example hard disc). The storage unit 52 serves for storing measurement data and/or CAD data which was used during a measurement of a reference workpiece. During a measurement of a reference workpiece, data relating to the position and orientation and the data of the light setting of the illumination device 48 that is used during the measurement of the reference workpiece is preferably stored in the storage unit 52. Said data (denoted as data relating to the reference pose and reference light setting) are used, as will be explained in detail below, for automated setting of the light conditions for measuring further workpieces.

The illumination device 48 is controlled using the control unit 44. Said control unit 44 is connected, as is schematically illustrated in FIG. 2, to the pose determination unit 50 for determining the data relating to the position and orientation of the workpiece to be measured and also to the storage unit 52. The data connection between the pose determination unit 50, the storage unit 52, and the control unit 44 is preferably realized in the form of a cable-bound connection. However, cable-free connections are likewise conceivable in principle. The control unit 44 is preferably a storage-programmable controller. It is configured to control the illumination device 48 on the basis of the data that is received from the pose determination unit 50 and on the basis of the data that is stored in the storage unit 52. Additionally or alternatively, the control unit can also be used for controlling an actuator 54, which can be used to physically move the illumination device 48. Accordingly, the actuator 54 could also be configured to move the workpiece table, since what counts in this embodiment is only a relative movement between the illumination device 48 and the workpiece.

Figure 3A:
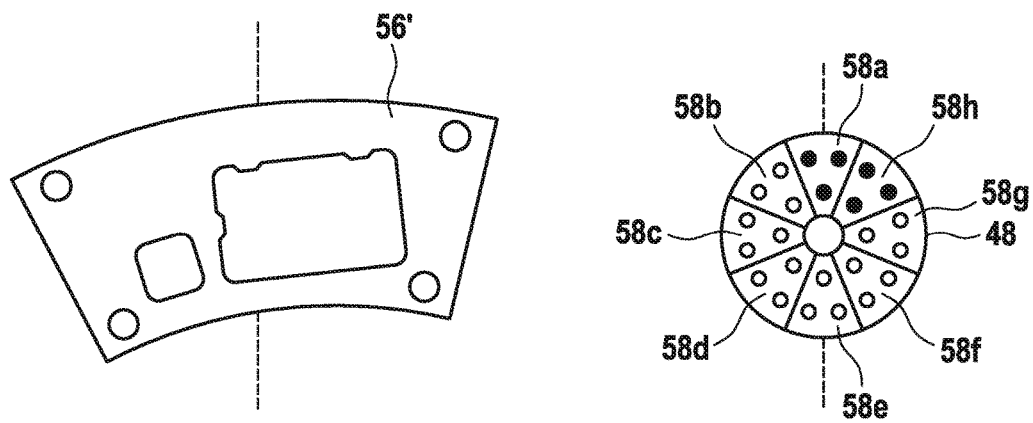
FIGS. 3A and 3B show a schematic sketch for the schematic illustration of a first exemplary embodiment.

FIG. 3 illustrates one possibility for controlling the illumination device 48 according to a first exemplary embodiment of the present disclosure. FIG. 3A shows a reference workpiece 56' on the left-hand side. On the right-hand side, it schematically shows the illumination device 48 in plan view from below, that is to say as viewed from the measurement table 14 or as viewed from the workpiece.

Figure 3B:
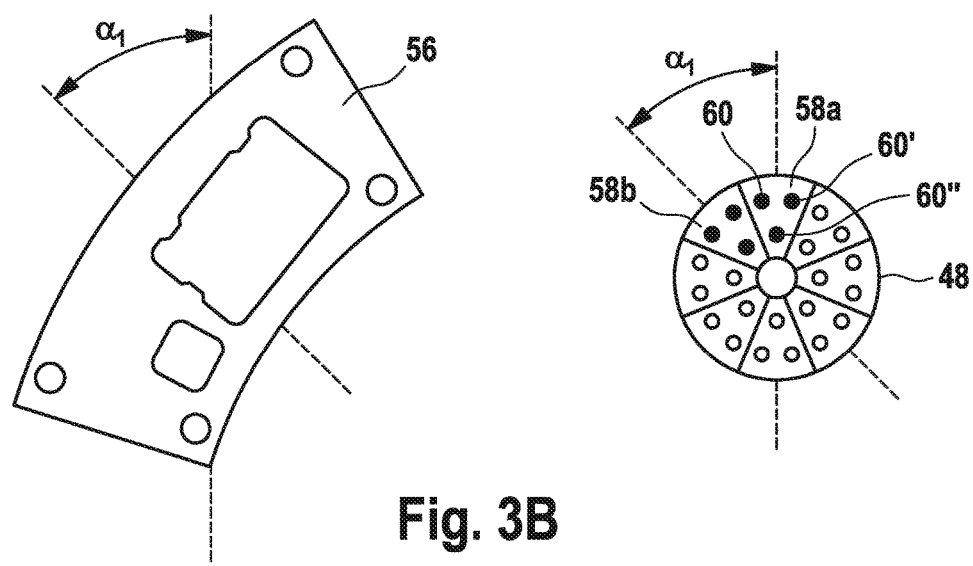

The illumination device 48 has a plurality of illumination segments 58*a*-58*h*. In the present case, there are eight illumination segments 58*a*-58*h* of identical size, which are arranged next to one another in regular fashion. The illumination segments 58 each have substantially the form of a circular ring segment. In the present exemplary embodiment, each illumination segment 58 has three illuminant 60, 60', 60" (see FIG. 3B). However, it is to be understood that a different form of illumination segments 58 is also conceivable in principle. It is likewise possible for each illumination segment 58 to be provided with more or fewer illuminant than is illustrated in FIGS. 3-5. What is important is that the light intensity of the illumination segments 58 is individually controllable, with the result that the illuminant 60 of one or more illumination segments 58 may be switched on, while the illuminant 60 of other illumination segments 58 are switched off. It is likewise preferred for the illuminant 60, 60', 60" to be individually controllable within each illumination segment 58. The illuminant 60, 60', 60" are preferably individually dimmable, either infinitely variably or incrementally. The illuminant 60, 60', 60" in each segment 58*a*-58*h* are preferably three differently colored illuminant. Each illumination segment 58*a*-58*h* thus preferably has a first illuminant 60 for generating light having a first color of light, a second illuminant 60' for generating light having a second color of light, and a third illuminant 60" for generating light having a third color of light. It is possible in this way to individually control, segment by segment, not only the light intensity, but also the color of the light emitted by the illumination device 48.

For the orientation of the reference workpiece 56', which is illustrated on the left-hand side in FIG. 3A, the optimum light setting of the illumination device 48 during a test phase was found, at which the illuminant 60, 60', 60" of the illumination segments 58*a* and 58*h* are switched on, while the illuminant 60, 60', 60" of the other illumination segments 58*b*-58*g* are switched off (see FIG. 3A on the right). The data relating to the position and orientation of the reference workpiece 56', which is determined during the test and setting phase, is then stored in the storage unit 52. In addition, the light setting of the illumination device 48 that is determined for the reference workpiece 56' is also stored in the storage unit 52. This data that is stored in the storage unit 52 can be used later during the measurement of a further workpiece, which exhibits component equivalence with the reference workpiece 56'.

FIG. 3B shows the orientation of a workpiece 56 to be measured, which is placed on the measurement table 14 and exhibits component equivalence with the reference workpiece 56'. However, as can be seen by way of a comparison of the respectively left-hand side of the FIGS. 3A and 3B, the workpiece 56 to be measured is rotated about an angle $\alpha_1$ relative to the reference workpiece 56'. The light setting of the illumination device 48, which is indicated schematically on the right-hand side of FIG. 3A and in which only the illumination segments 58*a* and 58*h* are switched on, would therefore no longer be appropriate for the workpiece 56 that is to be measured now (see FIG. 3B). The light setting of the illumination device 48 is therefore adapted, according to the disclosure, as follows:

In a first step, it is possible to determine, by way of comparing the data obtained from the reference workpiece 56' and the workpiece 56 that is to be measured now, whether they are workpieces that exhibit component equivalence. If this is the case, the position and orientation of the workpiece 56 to be measured are determined using the pose determination unit 50. This can be done either by tactile scanning of the workpiece 56 to be measured or on the basis of optical capturing of the workpiece 56 to be measured and subsequent image comparison of the image data that is obtained from the workpiece 56 with the image data of the reference workpiece 56' that is stored in the storage unit 52. The evaluation is performed in the control unit 44. To this end, shape-based matching between reference image and actual image is preferably carried out.

In a next step, the relative position and orientation change between the reference workpiece 56' and the workpiece 56 that is to be measured now is determined on the basis of the above-mentioned data comparison. The result is therefore the translational position displacement and the rotary orientation change of the workpiece 56 that is to be measured now relative to the reference workpiece 56'. In the example illustrated in FIG. 3, it is therefore possible in this way to determine the orientation change, which is expressed by the angle $\alpha_1$. The light setting of the illumination device 48 that is stored in the storage unit 52 for the reference workpiece 56' is then correspondingly adapted. This adaptation is effected on the basis of the comparison of the position and orientation of the reference workpiece 56', which are stored in the control unit 52, with the determined position and orientation of the workpiece 56 to be measured.

In the exemplary embodiment illustrated schematically in FIG. 3, the control unit 44 is configured to effect the previously mentioned adaptation of the light setting that is used for measuring the reference workpiece 56' by changing the assignment of the light intensity values to the individual illumination segments 58a-58h of the illumination device 48 based on the position and orientation comparison. In this example, therefore a virtual rotation of the illumination device 48 is brought about, which corresponds to the rotation about the angle $\alpha_1$. Since the angle $\alpha_1$, about which the workpiece 56 that is to be measured now is rotated relative to the reference workpiece 56', in the example shown in FIG. 3 also corresponds to the angular distance between two neighboring illumination segments 58, the light intensity values that are assigned to each illumination segment 58 in the light setting for the reference workpiece 56' can thus simply be assigned in each case to the illumination segment 58 that is the neighbor in the anticlockwise direction. The reference light intensity values that are assigned to the illuminant 60, 60', 60" in the illumination segment 58a can thus be assigned to the corresponding illuminant 60, 60', 60" in the illumination segment 58b. Accordingly, the light intensity values which are assigned to the illuminant 60, 60', 60" in the illumination segment 58h according to the light setting that applies to the reference workpiece 56' can be correspondingly assigned to the illuminant 60, 60', 60" in the illumination segment 58a during the measurement of the workpiece 56. The movement of the workpiece 56 relative to the reference workpiece 56' is thus reproduced or adapted by way of the corresponding adaptation of the light intensity values that are assigned to the illuminant 60, 60', 60" in the illumination segment 58.

By way of this adaptation of the light setting of the illumination device, it is thus possible for the optimum illumination scenario determined for the reference workpiece 56' to be automatically reproduced, specifically independently of the alignment of the workpiece 56 on the workpiece table 14.

Figure 4A:
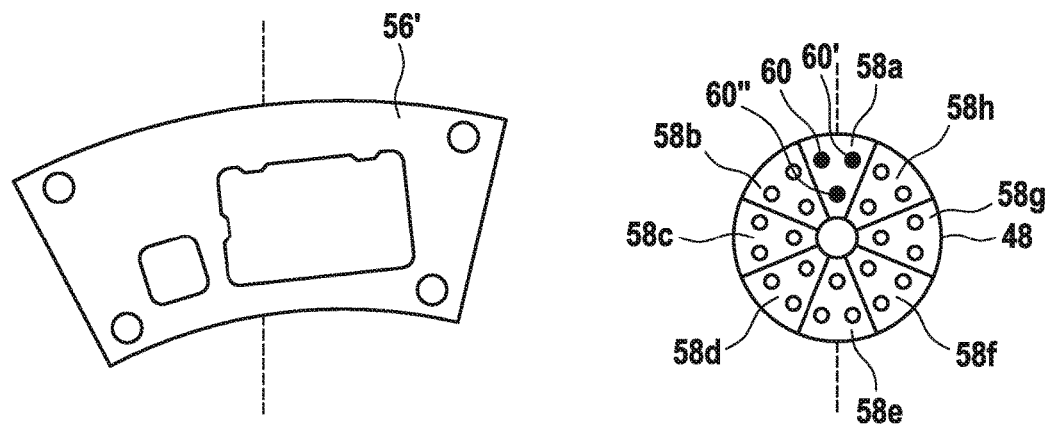
FIGS. 4A and 4B show a schematic sketch for the schematic illustration of a second exemplary embodiment.
Figure 4B:
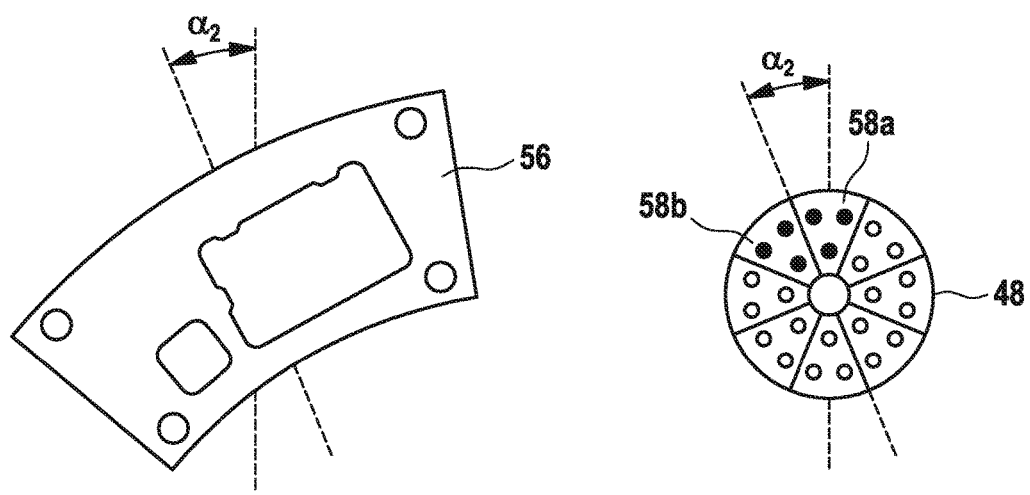
Figure 5A:
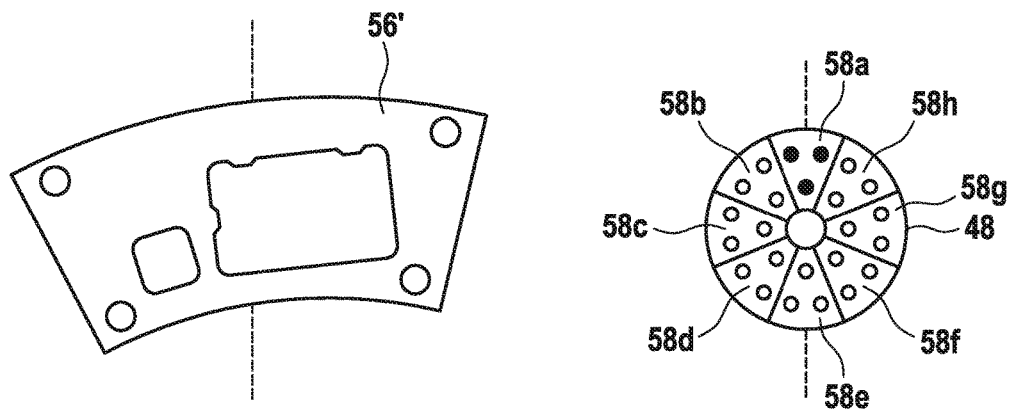
FIGS. 5A and 5B show a schematic sketch for the schematic illustration of a third exemplary embodiment.
Figure 5B:
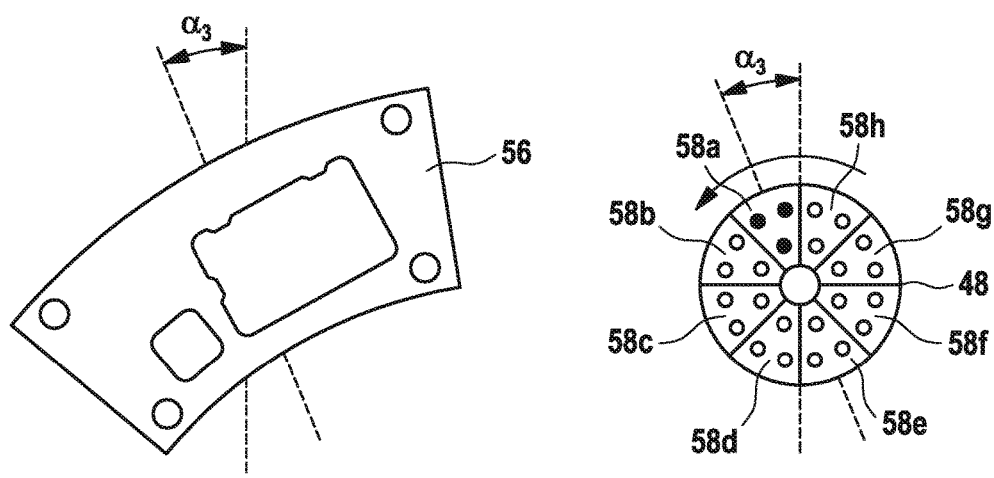

FIGS. 4A and 4B schematically illustrate a further illumination scenario. The principle that the control unit 44 is configured to effect the position and orientation adaptation between the workpiece 56 to be measured and the reference workpiece 56' using adaptation of the light intensity values that are assigned to the illumination segments 58a-58h remains the same, as was explained with respect to the example shown in FIG. 3. However, the problem arises in this example that the workpiece 56 is rotated relative to the reference workpiece 56' by an angle $\alpha_2$, which does not correspond to the angular distance between two neighboring illumination segments 58. In the present example, the rotation angle $\alpha_2$ corresponds to half the angular distance between two neighboring illumination segments 58.

According to the light setting of the illumination device 48 that was determined for the measurement of the reference workpiece 56' as being optimum and is stored in the storage unit 52, only the illuminant 60, 60', 60" of the illumination segment 58a are switched on (see FIG. 4A on the right). The control unit 44 according to this exemplary embodiment is configured to carry out the virtual rotation of the light setting of the illumination device 48 by interpolating between the light intensity values which are assigned to two neighboring illumination segments 58. In the example shown in FIG. 4, the result of this is that the intensity values that are assigned to the illuminant 60, 60', 60" in the illumination segment 58a according to the reference light setting are split during the measurement of the current workpiece 56 in each case at 50% between the illuminant 60, 60', 60" of the illumination segment 58a and the illuminant 60, 60', 60" of the illumination segment 58b. Accordingly, such interpolation between the light intensity values could also be carried out at different angles proportionally to the angular distance. The ratio between the light emitted by the illumination device 48 relative to the workpiece is in this case not exactly the same in the workpiece that is to be measured now as it is in the reference workpiece. The illumination properties appear to be very similar, however, with the result that this procedure appears to be acceptable from a technological point of view for the majority of applications.

A further possibility of illumination onto a position or orientation change of the workpiece 56 is schematically illustrated in FIG. 5. Instead of a virtual rotation, which is done by way of a reassignment of the light intensity values to the individual illumination segments 58, the control unit 44 according to this example is configured to move the illumination device 48 physically using the actuator 54. The orientation difference that is determined between the reference workpiece and the workpiece that is to be measured now and which is expressed by way of a rotation by an angle $\alpha_3$ is thus compensated for in this example by an actual rotation of the illumination device 48 by the same angle $\alpha_3$ about the z-axis 34.

According to a further exemplary embodiment (not explicitly illustrated here) it is possible for the control unit 44 to be configured to carry out a rotatory component of an orientation change between the workpiece 56 that is to be measured now and the reference workpiece 56' by way of one of the above-mentioned adaptation possibilities of the illumination device 48 and to carry out a translational component of the position change between the workpiece 56 that is to be measured now and the reference workpiece 56' using a corresponding compensation movement of the measurement table 14 along the x-axis 18 and/or y-axis 20.

However, it is to be understood that the translational component of the position change between the workpiece 56 that is to be measured now and the reference workpiece 56' can likewise be compensated for by way of a virtual or actual, physical movement of the illumination device 48 in accordance with one of the above-mentioned possibilities. A measurement table 14, which is translationally displaceable along the x-axis 18 and/or y-axis 20 is therefore not mandatory for the implementation of the present disclosure.

What claimed is:

1. A coordinate measuring machine comprising:
   an optical sensor for optically capturing a workpiece;
   an illumination device for illuminating the workpiece,
   a pose determination unit for determining data relating to a workpiece pose including a position and orientation of the workpiece,
   a storage unit for storing (i) data relating to a reference pose including a position and orientation of a reference workpiece, and (ii) data relating to a reference light setting of the illumination device used for a measurement of the reference workpiece, and
   a control unit which is configured to control a light setting of the illumination device for a measurement of the workpiece by adapting the reference light setting based on a comparison of the stored data relating to the reference pose with the determined data relating to the workpiece pose.

2. The coordinate measuring machine according to claim 1, wherein the coordinate measuring machine comprises an actuator for moving the illumination device relative to the workpiece, and wherein the control unit is configured to effect the adaptation of the reference light setting by way of moving the illumination device using the actuator.

3. The coordinate measuring machine according to claim 1, wherein the illumination device comprises a plurality of illumination segments, whose light intensity may be regulated individually, and wherein the control unit is configured to effect the adaptation of the reference light setting by way of individually regulating the light intensity of the plurality of illumination segments.

4. The coordinate measuring machine according to claim 3, wherein the data relating to the reference light setting comprise a reference assignment of individual light intensity values for each of the plurality of illumination segments, and wherein the control unit is configured to effect the adaptation of the reference light setting by adapting said reference assignment based on the comparison of the stored data relating to the reference pose with the determined data relating to the workpiece pose.

5. The coordinate measuring machine according to claim 4, wherein the adaptation of the reference assignment includes an interpolation between light intensity values assigned in said reference assignment to two neighbouring illumination segments of the plurality of illumination segments.

6. The coordinate measuring machine according to claim 3, wherein each of the plurality of illumination segments is of a circular ring segment shape.

7. The coordinate measuring machine according to claim 3, wherein each of the plurality of illumination segments has at least one illuminant.

8. The coordinate measuring machine according to claim 3, wherein each of the plurality of illumination segments has at least one first illuminant for generating light of a first colour and at least one second illuminant or generating light of a second colour.

9. The coordinate measuring machine according to one of claim 1, wherein the illumination device is arranged coaxially around the optical sensor.

10. The coordinate measuring machine according to claim 1, wherein the illumination device has a shape of an annulus.

11. The coordinate measuring machine according to claim 1, wherein the optical sensor is part of the pose determination unit, wherein the data relating to the reference pose comprise image data of the reference workpiece, wherein the data relating to the workpiece pose comprises image data of the workpiece, and wherein the control unit is configured to effect the comparison of the stored data relating to the reference pose with the determined data relating to the workpiece pose by way of comparing the image data of the reference workpiece with the image data of the workpiece.

12. The coordinate measuring machine according to claim 11, wherein the control unit is configured to compare the image data of the reference workpiece with the image data of the workpiece using a computer-based matching.

13. The coordinate measuring machine according to claim 1, wherein the pose determination unit comprises a tactile sensor.

14. Method for controlling an illumination device of an optical coordinate measuring machine, comprising the following steps:
   storing (i) data relating to a reference pose including a position and orientation of a reference workpiece, and (ii) data relating to a reference light setting of the illumination device used for a measurement of the reference workpiece,
   determining data relating to a workpiece pose including a position and orientation of a workpiece to be measured, and
   controlling the light setting of the illumination device for a measurement of the workpiece by adapting the reference light setting based on a comparison of the stored data relating to the reference pose with the determined data relating to the workpiece pose.

* * * * *